Nov. 4, 1969            K. STEFFENS            3,476,286
HOUSING FOR ELECTRIC STORAGE CELLS
AND METHOD OF PRODUCING SAME
Filed Oct. 11, 1967

INVENTOR
KARL STEFFENS
BY Michael S Striker,
his ATTORNEY

United States Patent Office 3,476,286
Patented Nov. 4, 1969

3,476,286
HOUSING FOR ELECTRIC STORAGE CELLS AND METHOD OF PRODUCING SAME
Karl Steffens, Hagen-Vorhalle, Germany, assignor to Varta Aktiengesellschaft, Frankfurt am Main, Germany
Filed Oct. 11, 1967, Ser. No. 674,514
Claims priority, application Germany, Oct. 21, 1966, V 32,174
Int. Cl. B65d 41/04; H01m 35/20, 35/00
U.S. Cl. 220—39
3 Claims

ABSTRACT OF THE DISCLOSURE

The cover and the container or cup of the housing for an electric storage cell are connected to each other by means of mating threads. The cover may be provided with internal threads and the container may be provided with external threads, or vice versa. The threads can be coated with a solvent or with an adhesive prior to being placed into mesh with each other, and the cover and/or the container can be shrunk by heat treatment or by cooling to provide a fluid-tight seal between the threads. Adhesive and/or solvent can be used on a cover and/or container whose material shrinks in response to the application or withdrawal of heat to provide a more reliable connection which prevents leakage of electrolyte.

BACKGROUND OF THE INVENTION

The present invention relates to electric storage cells or accumulators in general, and more particularly to improvements in the construction, assembly and manufacture of housings for storage cells. Still more particularly, the invention relates to improvements in the manufacture, assembly and design of housings which can be used with advantage in button-type electric storage cells.

The housing of an electric storage cell normally comprises a main portion or container which accommodates the electrolyte and a second portion or cover. The connection between the container and cover should prevent leakage of electrolyte irrespective of whether the housing is used in an open cell or in a gaslight cell. In addition, the housing of a gastight seal should be sufficiently tight to prevent any uncontrolled escape of gases and to be capable of resisting internal pressures which develop when the cell is in use. The nature of the connection between the container and cover depends on the type of cell housing, i.e., whether the housing resembles a button, a cylinder or a prismatic body. In accordance with presently prevailing practice, the cover of the housing in a button-type cell or in a cylindrical cell is applied by pressing and the cover of the housing in a prismatic cell is secured to the container by welding. The container and/or the cover can consist of plastic or metallic material, i.e., it is possible to employ a fully metallic housing, a fully plastic housing or a housing which consists in part of metal and in part of plastic.

The just mentioned connections between the covers and containers of presently known electric storage cells exhibit a number of serious drawbacks. For example, and in order to insure satisfactory sealing action, a sealing ring of synthetic plastic material is interposed between the cover and container in the housing of a button-type or cylindrical cell prior to the application of deforming pressure. The ring is coated with a layer of bituminous lacquer and a similar layer is applied to that portion of the container which is to be engaged by the cover. The container has a bead which is flattened in response to application of pressure and this step, together with the application of lacquer, is intended to provide a fluidtight seal between the container and the cover. However, it was found that such connections cannot prevent leakage of electrolyte which escapes between the container and the sealing ring. This is attributed to the fact that, in the just described connection, there exist two paths along which the electrolyte can escape, namely, between the ring and the cover and/or between the ring and the container. Furthermore, leakage of electrolyte is also attributed to the fact that mere application of pressure against the cover and/or container in the housing of a button-type cell or cylindrical cell cannot eliminate all cavities or pipe. Therefore, crystals of carbonate develop along the deformed edge of the container. In the first step, the container of a button-type cell is normally placed into a female die and the sealing ring is inserted into its open end. The cover is placed over the sealing ring within the confines of the open end of the container and a ram is moved into deforming engagement with the cover to subject it to a pressure in the axial direction of the container. At the same time, the edge of the container around its open end is upset inwardly to overlie the cover. Inherent elasticity of the parts causes the upset edge to yield when the ram pressure is terminated and the container develops an annular cavity in the region where its curvature is greatest. Such cavity is not filled with the material of the sealing ring. The pressure in the cavity is below atmospheric pressure and, when the pressure in the interior of the cell housing rises, electrolyte bleeds into the cavity and develops crystals which are observable along the edge of the container.

Attempts to eliminate the formation of carbonate crystals include the provision of relatively long paths along which the electrolyte must flow in order to reach the cavity within the deformed edge portion of the container. Also, certain proposals include the use of very compact sealing rings which are applied around the separator or separators in the cell housing. However, even such measures fail to prevent the formation of carbonate crystals.

Another serious drawback of just described conventional methods of sealing the housing of a storage cell is that the upset portion of the container occupies too much room, particularly in the radial direction of a button-type or cylindrical cell. Moreover, electrolyte will leak even if the radially extending part of the contaienr is subjected to radially inwardly directed pressure to reduce the diameter of the housing. It was found that leakage of electrolyte cannot be prevented even if the entire marginal portion of the cover is surrounded by the material of the sealing ring and even if the radially outwardly extending bulge of the container is deformed radially inwardly in a calibrating mandrel or the like. Similar problems are encountered if the meeting portions of the container and cover are provided with sharp edges. For example, it was proposed to provide the container with one or more annular cutting edges which penetrate into the material of a plastic cover. It was found that the material of the cover begins to flow at elevated pressures and develops leaks in regions which are subjected to maximum stresses.

SUMMARY OF THE INVENTION

It is an object of my invention to provide a novel and improved method of producing and assembling the housing of an electric storage cell according to which leakage of electrolyte along the connection between the container and cover can be prevented in a simple and inexpensive way.

Another object of the invention is to provide a fluid-tight connection between the container and cover of the housing in an electric storage cell.

A further object of the invention is to provide a novel housing for electric storage cells.

An additional object of the invention is to provide a novel method of sealing the connection between the container and cover of a storage cell.

A concomitant object of the invention is to provide a housing for use in electric storage cells which can be readily assembled with or disengaged from one or more similar housings.

A further object of the invention is to provide a novel container and a novel cover for the housing of an electric storage cell.

The method of my invention comprises the steps of assembling the housing of an electric storage cell or accumulator of several portions and providing such portions with mating internal and external threads which are placed into mesh with each other. The housing preferably comprises two portions one of which constitutes the container and the other of which constitutes the cover. In order to prevent leakage of electrolyte along the mating threads, at least one of the threads can be coated with a layer of adhesive which seals the clearance between the threads and hardens or sets to provide with the threads an absolutely leakproof connection between the container and cover. If one of the two portions consists of a material which can be surface-softened by a suitable solvent, such solvent is applied to the threads of the respective portion and is expelled by heating subsequent to placing the threads of the two portions into mesh with each other. Alternatively, and if the material of one portion is shrinkable in response to the application of heat or in response to cooling, a heating or cooling action is applied after the threads are placed into mesh with each other. Adhesive may be provided on one or both threads prior to the application of such heating or cooling action.

The novel features which are considered as characteristic of the invention are set forth in particular in the appended claims. The improved housing itself, however, both as to its construction and the mode of assembling it, together with additional features and advantages thereof, will be best understood upon perusal of the following detailed description of certain specific embodiments with reference to the accompanying drawing.

DESCRIPTION OF THE PREFERRED EMBODIMENTS

Figure 1:
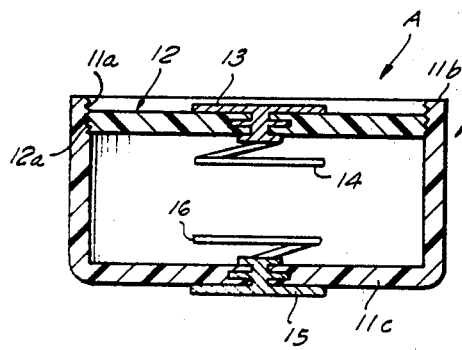
FIG. 1 is an axial sectional view of a housing for a button-type electric storage cell wherein the container is round and is provided with internal threads meshing with the external threads of a flat disk-shaped cover.

FIG. 1 illustrates a housing A for a button-type electric storage cell or accumulator which comprises two portions 11 and 12 connected to each other by means of internal threads 11a provided on the portion 11 and external threads 12a provided on the portion 12. The portion 11 constitutes a round or substantially round cupped container and the internal threads 11a extend inwardly from its open end 11b. The portion 12 constitutes a cover and resembles a disk whose peripheral surface is provided with the threads 12a. The container 11 may consist of metallic material and the threads 11a can be formed therein by cutting or by rolling. The cover 12 consists of synthetic plastic material and its central portion carries a terminal or lead-in 13 which resembles a rivet and is embedded in the plastic material. A contact spring 14 is attached to the terminal 13 in the interior of the housing A. In the embodiment of FIG. 1, the container 11 also consists of synthetic plastic material and its bottom wall 11c carries a second terminal or lead-in 15 which is embedded in the material of the bottom wall 11c and is connected with a second contact spring 16.

It is clear that the bottom wall 12c can be replaced by a second cover which is similar to or identical with the cover 12 and is attached to the container 11 by a second set of mating threads corresponding to the threads 11a, 12a. Furthermore, the portions 11, 12 of the housing A may consist of metallic material or only the cover 12 may consist of metal. The axial length of the container 11 may exceed its diameter and the external surface of the container may but need not be circular.

Figure 2:
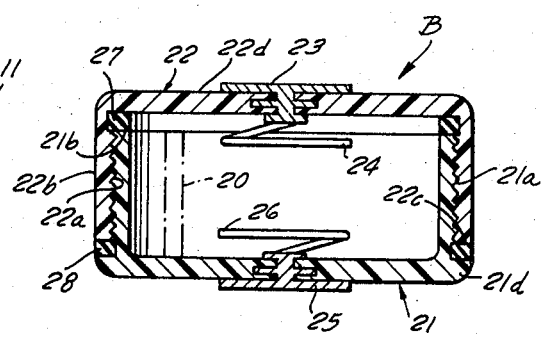
FIG. 2 is a similar axial sectional view of a second housing wherein the cover is provided with an annular portion having internal threads which mesh with the external threads of a round container.

FIG. 2 shows a second housing B which can be used in a button-type storage cell and comprises a round first portion or container 21 and a second portion or cover 22. The cover 22 is cupped and its annular portion 22b is provided with internal threads 22a which mate with external threads 21a provided on the container 21 in the region between the open end 21b and an annular external collar 21d which is remote from the open end 21b. The parts 21, 22 consist of synthetic plastic material and respectively carry terminals 25, 23 connected to contact springs 26, 24 accommodated in the interior of the housing B. Annular sealing elements 27, 28 of rubber or the like are provided at the axial ends of the threads 21a, 22a. The sealing element 28 is interposed between the collar 21d and the adjoining open end 22c of the cover 22. The other sealing element 27 is interposed between the open end 21b of the container 21 and the internal surface of the bottom wall 22d on the cover 22.

An important advantage of the embodiment shown in FIG. 2 is that the cover 22 surrounds the major portion of the container 21 and that the path along which the electrolyte must leak between the mating threads 21a, 22a is very long. The pitch of threads is preferably small so that the parts 21, 22 can be formed with a large number of threads to provide a superior sealing action and a strong connection. The sealing elements 27, 28 are optional because the threads 21a, 22a are normally capable of preventing escape of electrolyte. These sealing elements extend across the path along which the electrolyte must leak toward the open end 22c of the cover 22.

Figure 3:
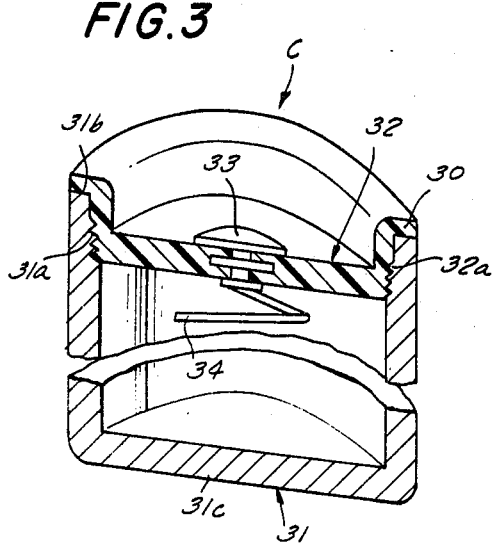
FIG. 3 is a perspective axial sectional view of a third housing which constitutes a modification of the housing shown in FIG. 1.

FIG. 3 illustrates a housing C including a first portion or container 31 and a second portion or cover 32. The latter is provided with external threads 32a and with an external flange 30 which abuts against the open end 31b of the container 31 when the threads 32a mesh with internal threads 31a. Thus, the flange 30 acts as a stop to determine the extent to which the central portion of the cover 32 can be introduced into the container 31. The cover 32 consists of plastic material and its central portion carries a terminal 33 connected with a helical contact spring 34. A similar terminal can be provided in the bottom wall 31c of the container 31. Furthermore, a sealing element can be inserted between the flange 30 and the open end 31b.

Figure 4:
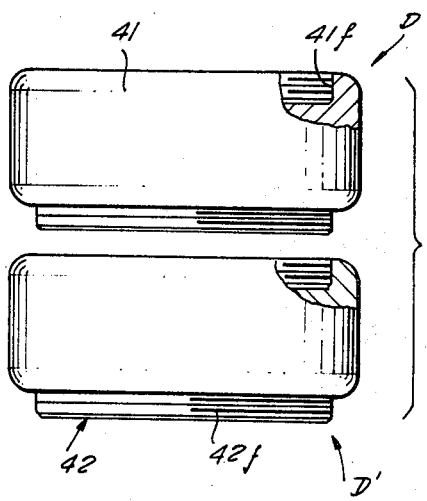
FIG. 4 is a side elevational view of two identical housings which are similar to the housing of FIG. 2 and are provided with additional threads by means of which they can be detachably connected to each other to form a stack.

FIG. 4 shows two housings D, D' each of which comprises a container 42 and a cover 41. The covers 41 are similar to the cover 22 of FIG. 2. In addition, each cover 41 is provided with an internally threaded portion or socket 41f which can receive an externally threaded portion or plug 42f of the adjoining housing 42. In this way, the housings D, D' can be detachably coupled to each other to form a stack. Any desired number of such housings can be coupled to form a stack of requisite height.

If the two portions of a housing consist of synthetic plastic material, they can be provided with one or more grooves extending axially of the threads and accommodating a mass or filler of hardenable synthetic plastic material. This is shown in FIG. 2 by a pair of phantom-lines 20 which denote the boundaries of registering grooves provided in the container 21 and cover 22. The material which fills these grooves also prevents uncontrolled separation of the cover 22. Since the grooves between the lines 20 extend across the threads 21a, 22a, they are bounded by two meandering lines.

Another very satisfactory connection between a cover and a container can be achieved if one of these portions consists of a material which can be softened by the application of a suitable solvent. For example, the internal threads 22a of the cover 22 in FIG. 2 can be coated with a solvent for plastic material and, when the solvent evaporates subsequent to placing of threads 22a into mesh with the threads 21a, the material of the cover 22 completely fills the channels formed by the threads 21a to provide an absolutely fluidtight connection. Alternatively, the threads 21a and/or 22a can be coated with an adhesive which fills the clearances between the threads and insures a strong connection which prevents leakage of electrolyte and can withstand pressures developing in the interior of the housing. It is not necessary to apply weights to the container and/or cover of a housing wherein the threads are coated with adhesive or solvent because, once the cover is properly screwed into or onto the container, pressures which develop when the cover is drawn tight suffice to insure that the adhesive fills all cavities or gaps between the threads and provides an absolutely fluidtight sealing action. Such adhesive can also compensate for eventual inaccuracies in the profile of threads. The adhesive also prevents unscrewing of the cover and automatically fills all spaces between the overlapping portions of the cover and container.

If the material of the container and/or cover shrinks in response to a change in temperature, particularly in response to heating, the sealing action of mating threads can be enhanced by heating or cooling subsequent to placing of threads into mesh with each other. This method of assembling a housing is particularly advantageous if the cover is provided with internal threads and consists of plastic material and if the container consists of metallic material. Referring again to FIG. 2 and assuming that the cover 22 consists of plastic material and that the container 21 consists of metal, the threads 21a and/or 22a may but need not be coated with a solvent or adhesive and the cover is then placed into mesh with the container. In the next step, the cover 22 is heated by means of an infrared heater, lamp or hot fluid whereby its material shrinks and its annular portion 22b between the sealing elements 27, 28 follows closely the outline of the adjoining portion of the container 21. The cover can be heated to a temperature of between 100–250° C., depending on the nature of plastic material. The material of the cover tends to shrink axially and radially, and this contributes to a highly satisfactory sealing action.

Of course, the cover 22 can be heated in order to effect at least some shrinkage even if the container 21 consists of plastic material. The container can be caused to shrink less than the cover 22, for example, by subjecting it to a less intensive heating action. In the embodiment of FIG. 1, the container 11 can be treated by application of heat to reduce its diameter and to insure a more satisfactory sealing action along the mating threads 11a, 12a. In each instance, the heating action can be preceded by application of a solvent and/or adhesive to the internal threads and/or the external threads.

The advantages of my improved housing and method can be summarized as follows: The connection which secures the cover to the container is established between large portions of surfaces on these parts without necessitating the use of a large housing. In presently known housings wherein the cover is applied by pressure alone, the area of abutting surfaces on the cover and container is very small, often merely along a relatively narrow strip extending circumferentially around the cover or in a plane which is normal to the axis of the container. The mating threads on the housing portions shown in the drawings provide a series of circumferentially extending sealing surfaces which can prevent leakage of electrolyte and can be placed into sealing engagement without resorting to excessive pressures. The total number of sealing surfaces in the connection of my invention equals the number of convolutions multiplied by two to account for both flanks of each convolution. The sealing action can be modified by changing the depth of threads, the configuration of threads, the pitch, the combined number of convolutions and/or a combination of these. It was found that relatively deep threads with long flanks and small angles at the crests are more satisfactory than flat threads.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. A method of assembling the housing of an electric storage cell wherein the housing includes two portions at least one of which consists of material which shrinks in response to a change in temperature, comprising the steps of providing one of said portions with internal threads, providing the other portion with complementary external threads, placing said internal threads into mesh with said external threads, and changing the temperature of said at least one portion upon placing of said threads into mesh with each other.

2. A method as defined in claim 1, wherein said one portion is the cover and the other portion is the container of said housing.

3. A method as defined in claim 2, wherein said first mentioned step comprises forming said cover with internal threads so that, upon shrinking, the cover provides a fluidtight seal around the container.

References Cited

UNITED STATES PATENTS

| 2,617,863 | 11/1952 | Stinson | 136—166.1 X |
| 2,876,926 | 3/1959 | Gronemeyer | 220—39 |
| 2,993,948 | 7/1961 | VaClaw | 136—133 X |
| 3,003,013 | 10/1961 | Duddy | 136—111 X |

GEORGE T. HALL, Primary Examiner

U.S. Cl. X.R.

136—9, 166; 220—46, 66